Feb. 17, 1925.

J. W. BERRY ET AL

SWITCH

Filed July 1, 1921        2 Sheets-Sheet 1

1,526,623

J. W. Berry
R. McKnight  Inventors

By C.A.Snow & Co.
Attorneys.

Feb. 17, 1925.
J. W. BERRY ET AL
SWITCH
Filed July 1, 1921
1,526,623
2 Sheets-Sheet 2
Fig. 3.
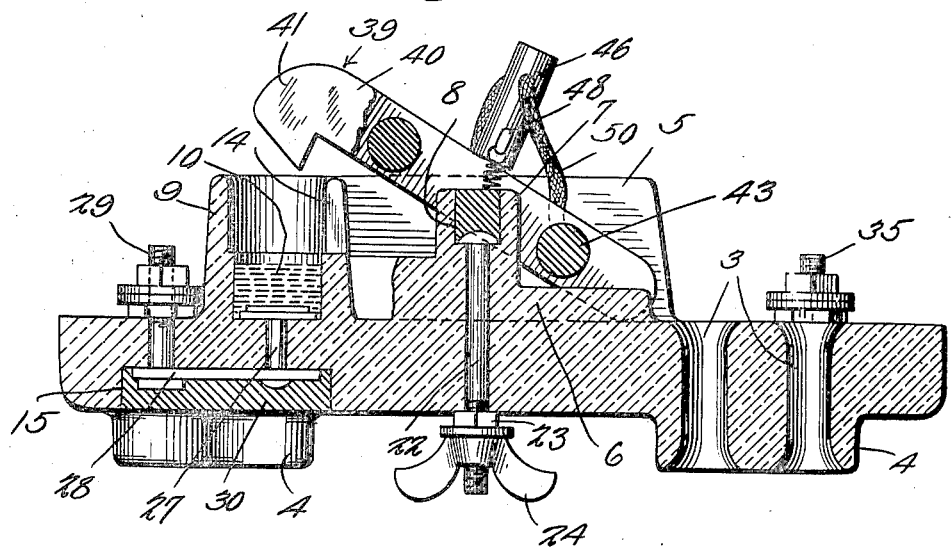
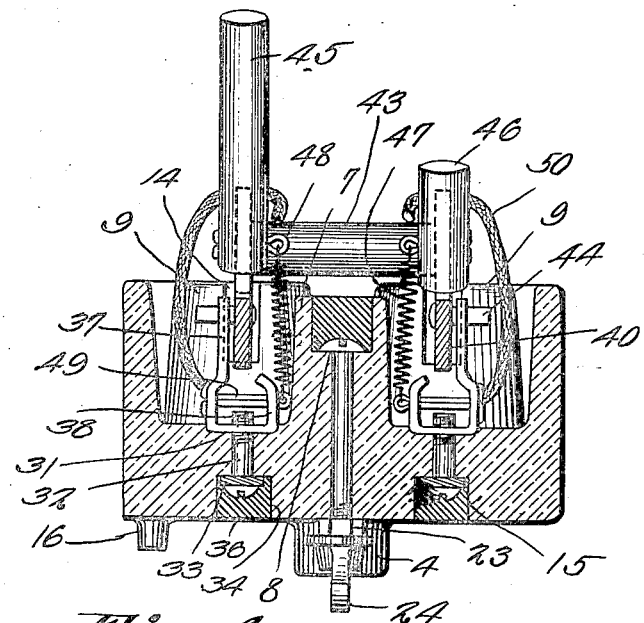
Fig. 4.
J. W. Berry
R. McKnight
Inventors,
By C. A. Snow & Co.
Attorneys.

Patented Feb. 17, 1925.

1,526,623

UNITED STATES PATENT OFFICE.

JAMES W. BERRY, OF MARINE CITY, MICHIGAN, AND ROBERT McKNIGHT, OF SARNIA, ONTARIO, CANADA.

SWITCH.

Application filed July 1, 1921. Serial No. 481,971.

*To all whom it may concern:*

Be it known that we, JAMES W. BERRY, a citizen of the United States, residing at Marine City, in the county of Saint Clair and State of Michigan, and ROBERT McKNIGHT, a subject of the King of England, residing at Sarnia, in the Province of Ontario and Dominion of Canada, have invented a new and useful Switch, of which the following is a specification.

The device forming the subject matter of this application is an electrical switch, and the invention aims primarily, to improve the tiltable member of the switch and the means for operating and controlling the same, the construction being such that the switch may embody, as one of its terminals, a mass of mercury or other conducting liquid.

Another object of the invention is to provide novel means whereby after the tiltable member of the switch has been moved to a predetermined point, the movement of the tiltable member, to a closed or an open position will be brought about automatically.

A further object of the invention is to improve the construction of the switch so that the same may be used advantageously in connection with a time-controlled mechanism.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
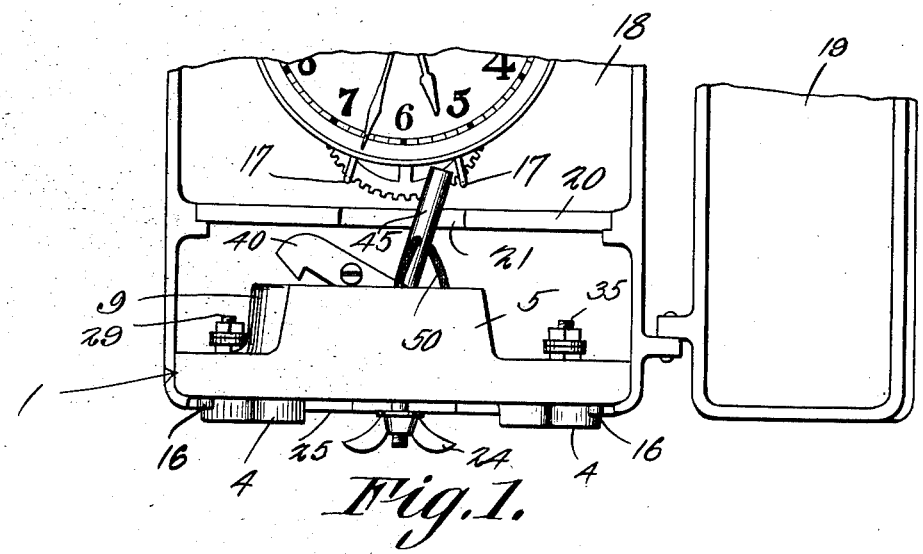
Figure 2:
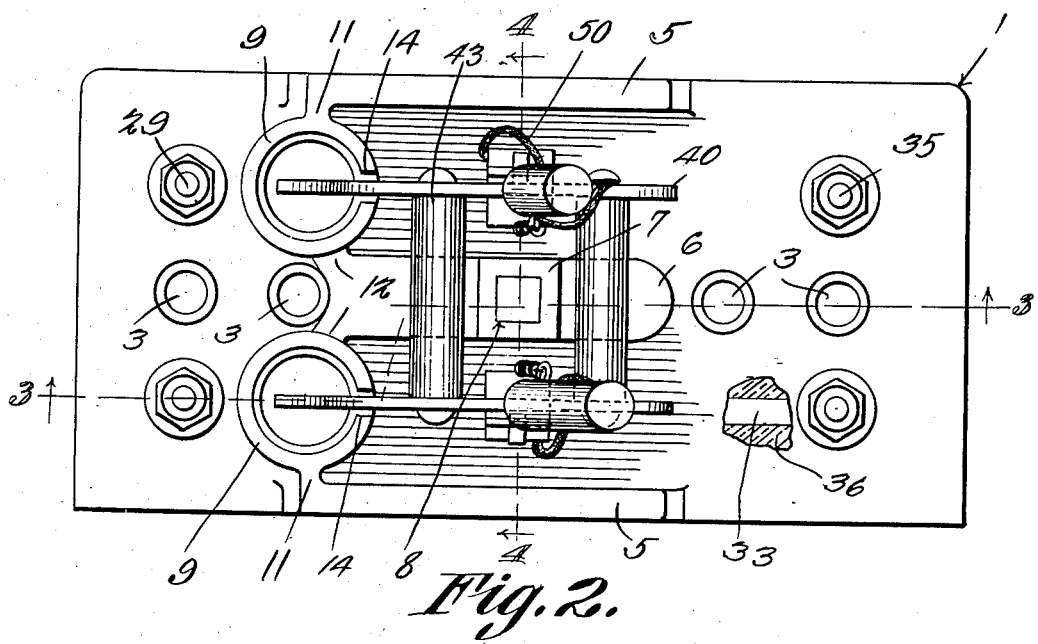

Figure 1 shows in elevation, a switch constructed in accordance with the invention, mounted in place, for use in connection with a time-controlled mechanism; Figure 2 is a top plan of the switch; Figure 3 is a section on the line 3—3 of Figure 2; and Figure 4 is a section on the line 4—4 of Figure 2.

In carrying out the invention there is provided a support, denoted generally by the numeral 1, which may be made of some non-conducting material, such as porcelain. The support 1 includes a base 2 in the form of a plate having openings 3 for the passage of conductors, the openings extending through bosses 4 projecting downwardly from the base 2. Side walls 5 upstand from the base 2. A rib 6 is located between the side walls 5 and upstands from the base 2. The rib 6 carries an upwardly projecting lug 7 having a recess 8 in its upper end. Cups 9 are formed integrally with the base 2 and are adapted to contain mercury or other conducting liquid, indicated at 10. The cups 9 are joined at 11 to the side walls 5, and are joined at 12 to the rib 6. Notches or seats 14 are fashioned in the upper edges of the cups 9. Elongated recesses 15 are formed in the lower surface of the base 2, the recesses extending beneath the cups 9. The base 2 has depending stop lugs 16.

The switch is adapted to be used in connection with a time-controlled mechanism 17 located in a casing 18 provided with a lid 19, the casing having a transverse partition 20 provided with an opening 21. The time-controlled mechanism will not be described in detail, because it is shown in our co-pending application Serial No. 516,160, filed on the 18th day of November, 1921, and because it is conceded that a specific form of time-controlled mechanism cannot be claimed in the same application with a specific form of switch.

The base 2 of the switch rests on the bottom 25 of the casing 18, the lugs 16 engaging the bottom to limit the inward movement of the base 2 of the switch. A securing element, such as a bolt 22, passes downwardly through the base 2. A nut 23 is threaded on the securing element 22 and engages the lower surface of the base 2. The securing element 22 is received in the bottom 25 of the casing 18, a wing nut 24 being threaded on the securing element 22, the wing nut engaging the bottom of the casing. The head of the securing element 22 is located in the recess 8 of the lug 7, a quantity of sealing material 26 being located in the recess, to cover the head of the securing element. Terminals 27 are mounted in the base 2 and extend into the cups 9, the mercury 10 or other conducting liquid being in contact with the upper ends of the terminals 27. The lower ends of the terminals 27 are connected to conductors 28 located in the recesses 15. Binding posts 29 are mounted in the base 2, the lower ends of the binding posts being connected to the conductors 28. A mass of sealing material, designated by the numeral 30, is placed in each recess 15 and covers the lower end of the binding post 29, the conductor 28 and the lower end of the terminal 27.

Brackets 31 are mounted on the base 2 and are held thereto by securing elements 32 connected to strips or conductors 33 located in elongated recesses 34 formed in the lower surface of the base 2. The strips or conductors 33 lead to binding posts 35 carried by the base. In each recess 34 a mass 36 of sealing material is located, the sealing material 36 covering the strips 33, the lower ends of the securing elements 32 and the lower ends of the binding posts 35. Each bracket 31 embodies an upstanding arm 37 and an upstanding arm 38, the arm 37 being of greater height than the arm 38.

The switch includes a tiltable member 39, which is a composite structure. The tiltable member embodies conducting side bars 40 having depending ends 41 adapted to enter the cups 9 and to engage with the conducting liquid 10. The notches 14 in the cups 9 are for the reception of the side bars 40 of the tiltable member, when the ends 41 of the side bars 40 move downwardly from the position of Figure 3. The side bars 40 are held apart by spacers 42, made of non-conducting material, securing members 43 passing through the side bars 40 and engaging the ends of the spacers. The side bars 40 are supplied with outwardly projecting trunnions 44, mounted pivotally in the arms 38 of the brackets 31. An arm 45 is carried by one of the side bars 40, an arm 46 being carried by the other of the side bars. The arm 46 is adapted to be used to tilt the member 39 at the hand of an operator, whereas the arm 45, as shown in Figure 1, is under the control of the time mechanism 17. Retractible springs 47 are provided, the upper ends of the springs 47 being connected at 48 to the arms 46 and 45, the lower ends of the springs 47 being connected to cotter pins or the like, denoted by the numeral 49, and mounted in the parts 37 and 38 of the bracket 31. The springs 47 are so located that when the arms 45 and 46 project vertically upward with respect to the trunnions 44, the springs will stand vertically, and will exert no pull tending to swing either end of the tiltable member 39 downwardly. When, however, the tiltable member 39 is swung beyond a predetermined point, the retractile springs 47 will exert a pull which will tend to complete the swinging movement of the tiltable member. Conductors 50 are connected at one end, by certain of the securing members 43, to the side bars 40 of the tiltable member 39. The conductors 50 pass through the arms 45 and 46, the said arms being made of insulating material. The lower ends of the conductors 50 are connected electrically to the brackets 31.

In practical operation, referring to Figure 1, suppose that the time-controlled mechanism 17 swings the tiltable member 49, by means of the arm 45, until the springs 47 exercise a pull tending to carry the ends 41 of the side bars 40 downwardly. Then, the ends 41 of the side bars 40 will enter the cups 9 and will contact with the mercury 10 therein. Then, at each side of the switch, there is established a circuit comprising the binding post 29, the part 28, the terminal 27, the mercury 10, the side bar 40, the conductor 50, the bracket 31, the securing element 32, the strip 33, and the binding post 35.

When the tiltable member 39 is swung into the position shown in Figure 1, the ends of the bars 40 rest on the base 2, under the action of the springs 47, the circuits being open, because the ends 41 of the side bars 40 of the tiltable member no longer dips into the mercury 10 in the cups 9. When the circuits are closed, the bars 40 rest on the cups 9 at the bases of the notches 14.

We claim:—

An electrical switch comprising a base, brackets on the base, a tiltable member comprising side bars and a connection therebetween, the side bars being pivotally mounted intermediate their ends on the brackets, insulating arms carried by the side bars, the mounting of the arms on the brackets serving to space the arms so that they can be engaged by different instrumentalities to tilt said member, conductors connected at their ends to the brackets and to the side bars and supported intermediate their ends on the arms, contact members on the base and adapted to cooperate with the side bars of the tiltable member, connectors on the base and means for uniting the connectors electrically with the brackets.

In testimony that we claim the foregoing as our own, we have hereunto set our hands.

JAMES W. BERRY.
ROBERT McKNIGHT.